Aug. 10, 1965            L. PÉRAS            3,199,912
BODIES OF AUTOMOTIVE VEHICLES
Filed Oct. 14, 1963
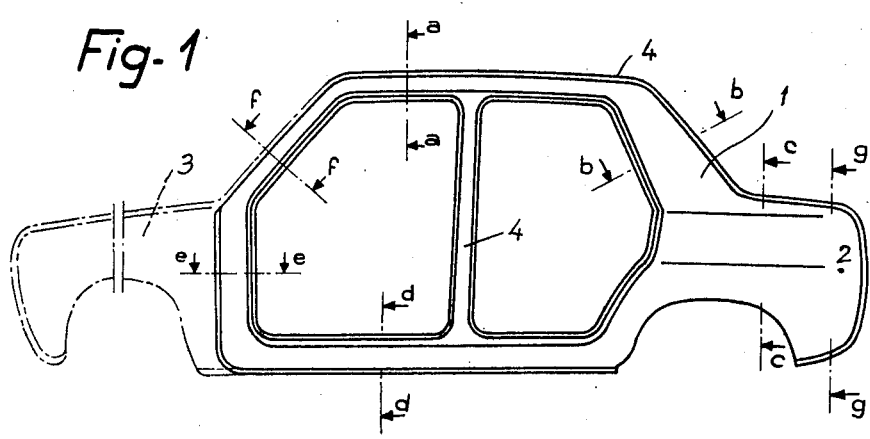
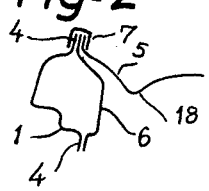
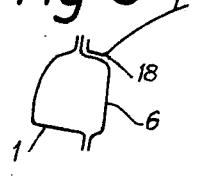
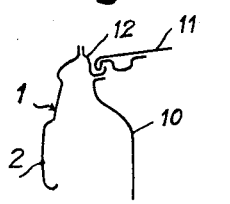
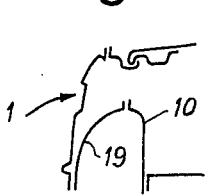
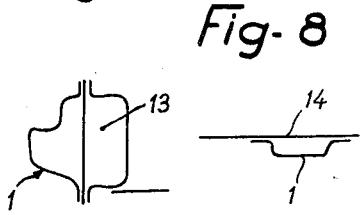
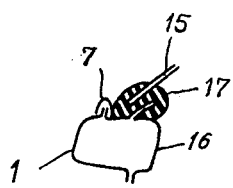
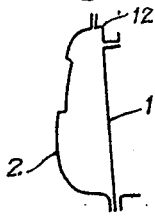
Inventor
Lucien Péras
By Stevens, Davis, Miller & Mosher
Attorneys 3,199,912
BODIES OF AUTOMOTIVE VEHICLES
Lucien Péras, Billancourt, France, assignor to Regie
Nationale des Usines Renault, Billancourt, France
Filed Oct. 14, 1963, Ser. No. 316,083
Claims priority, application France, Oct. 24, 1962,
913,310, Patent 1,345,097
4 Claims. (Cl. 296—28)

This invention relates in general to automobile body construction and has specific reference to a particularly simple method of assembling the hollow portion of the side panels with the various other sections of the vehicle body, notably the top.

This assembly is performed along an outer periphery edge directed to the outside of the top and contained in a simple surface (whether plane, cylindrical, or having a moderate or shallow curvature) extending in a substantially vertical direction. This assembly may also be accomplished by means of a continuous or nearly continuous edge extending throughout the length or periphery of the vehicle, including if desired the wings or the wheel housings. On the other hand, this edge may be discontinued at the windscreen side posts and/or at the rear wheel notches.

Wherever this edge might become apparent, have an unpleasant appearance or be dangerous, it can be concealed very easily by resorting to a protection and/or ornamental butt strap or a flanged or crimped marginal portion.

In addition, this assembly provides automatically a rain channel or drip moulding, thus simplifying considerably the design and actual construction. It may conveniently be obtained from a side panel of unitary or composite structure, the latter consisting of an outer member and an inner reinforcing member, and may further comprise or not the wings or the wheel housings and a top having a plurality of longitudinal sections.

This invention is remarkable notably in that the assembling edges may be formed directly by stamping and simply trimmed without any further steps or turning down.

The attached drawings illustrate diagrammatically various forms of embodiment of the present invention, which are given by way of example. In the drawings:

FIGURES 1 and 2 (FIGURE 2 being a section taken upon the line a—a of FIGURE 1) illustrate a particularly interesting type of assembly of a top 5 with the hollow rail portion of the side panel constituting outer member 1 and inner member 6 and including the rear wing 2 and if desired the front wing 3. The outer members of the body side panel is assembled along nearly the whole of its outer contour and along the inner contours of the door openings by means of edges or lips 4 directed in a substantially vertical plane with the corresponding edge or lip of inner member 6, top 5, and of the other component body elements or sections.

FIGURES 4, 5, 7, 8, 9 and 11 are respectively cross-sections taken upon the line b—b, c—c, d—d, e—e, f—f, g—g of FIGURE 1.

In these sectional views the following reference numerals designate respectively:

8, the back light glass,
9, the weatherstrip for sealing and fitting the glass 8,
10, the rear wheel inner side panel,
11, the boot lid,
12, the boot fillister or channel,
13, the lower longitudinal member of the body,
14, the cowl side panel or front bottom lining,
15, the windscreen,
16, the windscreen front post reinforcing elements,
17, the weatherstrip for sealing and fitting the windscreen.

The body side panel 1 may also be assembled beforehand with lining or reinforcing elements and the wheel inner side panel or panels. The assembly edges of the outer contour may be concealed by means of chrome or like beading or butt straps 7 (see FIGURE 2).

The absence of separate drip moulding permitted by the shape of the top, of which the component elements are separated by rain-channel or drip mouldings or grooves 18, provides an interesting and advantageous feature from the dual point of view of appearance and streamlining.

FIGURE 3 illustrates the a—a cross-section of the assemby when a top having a substantially conventional shape is used.

FIGURE 6 illustrates another possible form of embodiment of the wheel housing comprising two panels 10 and 19.

FIGURE 10 is a modified form of embodiment of the structure shown in FIGURE 9 (section f—f) wherein the assembly joint is concealed by the windscreen weatherstrip.

It will be readiy occur to anybody conversant with the art that the above description concerning one side of a unitary body side is also applicable when the body side does not include the front wing and/or the rear wing, or when these are replaced in the body side by inner side panels. Similarly, the body side termed "unitary" body side in this description may also consist of a plurality of assembled elements.

I claim:
1. An assembly for joining the roof panel of an automobile to the inner and outer members of the hollow rail portion of the side panels thereof, comprising two substantially vertical and parallel joints, one at each longitudinal edge of the roof; each of said joints comprising at least one upwardly turned lip on the edge of said roof panel, one upwardly turned lip of said inner member, and one upwardly turned lip of said outer member, said lips being mutually parallel and said lip of the inner member lying between and in contact with each of said other lips; and means rigidly securing said lips together.

2. The assembly of claim 1 wherein said securing means comprises a weld.

3. The assembly of claim 1 further comprising a butt strap disposed over said lips.

4. The assembly of claim 1 further comprising an integral drip groove formed in the roof panel extending parallel to each edge and defined by a slope of the edge of said panel downwardly and then upwardly at an oblique angle to form an upwardly extending leg, said upwardly turned lip on the edge of the roof panel being formed at the edge of said leg for assembly with said upwardly turned lips of said inner member and said outer member.

References Cited by the Examiner
UNITED STATES PATENTS

| | | | |
|---|---|---|---|
| 1,296,028 | 4/19 | Whittredge. | |
| 1,953,515 | 4/34 | Smith | 296—28 |
| 2,096,984 | 10/37 | Stief | 296—137 |
| 2,369,579 | 2/45 | Kobliegk | 296—28 |
| 2,388,419 | 11/45 | Komenda. | |
| 2,991,121 | 7/61 | Barenyi | 296—28 X |
| 3,112,952 | 12/63 | Barenyi | 296—137 |

FOREIGN PATENTS

| | | |
|---|---|---|
| 890,862 | 3/62 | Great Britain. |
| 1,191,280 | 4/59 | France. |

BENJAMIN HERSH, Primary Examiner.
A. HARRY LEVY, Examiner.